US012789457B2

(12) United States Patent
Burfeind

(10) Patent No.: US 12,789,457 B2
(45) Date of Patent: Nov. 10, 2026

(54) ADDITIVE MANUFACTURING FACILITY

(71) Applicant: Nikon SLM Solutions AG, Lübeck (DE)

(72) Inventor: Kai Burfeind, Agathenburg (DE)

(73) Assignee: NIKON SLM SOLUTIONS AG, Lübeck (DE)

( * ) Notice: Subject to any disclaimer, the term of this patent is extended or adjusted under 35 U.S.C. 154(b) by 59 days.

(21) Appl. No.: 18/864,093

(22) PCT Filed: Apr. 18, 2023

(86) PCT No.: PCT/EP2023/059997

§ 371 (c)(1),
(2) Date: Nov. 8, 2024

(87) PCT Pub. No.: WO2023/217496

PCT Pub. Date: Nov. 16, 2023

(65) Prior Publication Data

US 2025/0303638 A1 Oct. 2, 2025

(30) Foreign Application Priority Data

May 12, 2022 (DE) ........................ 10 2022 204 672

(51) Int. Cl.

| | |
|---|---|
| ***B29C 64/25*** | (2017.01) |
| ***B29C 64/329*** | (2017.01) |
| ***B33Y 30/00*** | (2015.01) |
| ***B33Y 40/00*** | (2020.01) |

(52) U.S. Cl.

CPC ............ *B29C 64/25* (2017.08); *B29C 64/329* (2017.08); *B33Y 30/00* (2014.12); *B33Y 40/00* (2014.12)

(58) Field of Classification Search

CPC ........ B29C 64/25; B29C 64/329; B22F 12/82
See application file for complete search history.

(56) References Cited

U.S. PATENT DOCUMENTS

| | | | | |
|---|---|---|---|---|
| 2017/0326643 | A1 | 11/2017 | Barr | |
| 2020/0016838 | A1 * | 1/2020 | Mcmurtry | B22F 10/28 |
| 2021/0370406 | A1 | 12/2021 | Bayramian et al. | |
| 2022/0008999 | A1 | 1/2022 | Friesth | |
| 2023/0393563 | A1 * | 12/2023 | Müller | B33Y 40/00 |

FOREIGN PATENT DOCUMENTS

| | | | | |
|---|---|---|---|---|
| DE | 102009029765 | A1 | 12/2010 | |
| DE | 102014116190 | B3 | 1/2016 | |
| DE | 102015119698 | A1 | 5/2017 | |
| DE | 102019208440 | A1 | 12/2020 | |
| DE | 102019212679 | A1 * | 2/2021 | B33Y 40/00 |

* cited by examiner

*Primary Examiner* — Virak Nguon
(74) *Attorney, Agent, or Firm* — McGlew and Tuttle, P.C.

(57) ABSTRACT

An additive manufacturing facility (1) includes an additive manufacturing machine (3) with a process chamber (5), a plurality of load items (7, 9, 11), and a loading system (14) for positioning the load items from a first loading zone (15) to a second loading zone (17*a,b*). The second loading zone is above and/or below the process chamber. The loading system includes a lifting column (21), a support arm (23) and a load item carrier (25). The support arm is coupled to the lifting column for vertical lifting and lowering along the lifting column. The load item carrier is coupled to the support arm for being moved along a defined horizontal path relative to the lifting column. The first loading zone is located in a front side area (31) of the loading system and the second loading zone is located in a rear side area (33) of the loading system.

20 Claims, 5 Drawing Sheets

ADDITIVE MANUFACTURING FACILITY

CROSS REFERENCE TO RELATED APPLICATIONS

This application is a United States National Phase Application of International Application PCT/EP2023/059997, filed Apr. 18, 2023, and claims the benefit of priority under 35 U.S.C. § 119 of German Application 10 2022 204 672.2, filed May 12, 2022, the entire contents of which are incorporated herein by reference.

TECHNICAL FIELD

The present disclosure relates to facilities for additive manufacturing of three-dimensional workpieces. In particular, the present disclosure relates to additive manufacturing facilities for serial production at an industrial scale, wherein the additive manufacturing facility comprises a plurality of additive manufacturing machines for parallel additive manufacturing of three-dimensional workpieces. More particularly, the additive manufacturing machines are preferably configured to apply laser powder bed fusion (LPBF) as the additive manufacturing technique for producing metallic workpieces.

BACKGROUND

Additive manufacturing of a three-dimensional workpiece is often referred to as 3D-printing. A specific form of additive manufacturing is laser powder bed fusion (LPBF), in which a layer of raw material powder is exposed to a high energy beam of electromagnetic radiation, such as, for example, a laser beam or a particle beam, for selectively sintering and/or melting particles of the raw material powder. The three-dimensional workpiece is manufactured by sequentially sintering and/or melting layer by layer of raw material powder.

Compared to conventional manufacturing techniques like molding, additive manufacturing of a single three-dimensional workpiece consumes considerably more time. Therefore, in the early days of 3D-printing, additive manufacturing was only applied for prototyping or for a small number of individual pieces. However, as additive manufacturing offers the possibility to design and produce components that cannot be used by other conventional manufacturing techniques, there is a demand for using additive manufacturing for serial production at an industrial scale. Serial production at an industrial scale requires quick and safe loading and unloading of certain load items that an additive manufacturing machine needs for a building job. For instance, a fresh building chamber must be put into an operating position below a process chamber before a building job can start and a filled building chamber must be transported away after the building job is finished. Another example is the supply of raw material powder. Depending on the type of raw material powder supply system the facility uses, a raw material powder tank must be filled or replaced before or during a building job in order to provide sufficient raw material powder to the additive manufacturing machine. Other load items such as lids of a building chamber or raw material powder funnels need to be transported and exactly positioned for serial additive manufacturing at an industrial scale.

All these load items have in common that they are usually quite heavy, e.g. 40 kg to 6,000 kg or more. The quick, exact and safe handling of such heavy load items is a particular challenge for serial additive manufacturing at an industrial scale. Typically, fork trucks or jack lifts are manually maneuvered and operated by operating personnel. A relatively large operating area must be cordoned off for safety reasons. The exact positioning of the load items requires specific manual skills and consumes time.

SUMMARY

It is therefore an object of the present disclosure to provide an additive manufacturing facility allowing a quicker and safer handling of heavy load items to be loaded to and unloaded from a manufacturing machine of the facility.

A solution to this problem is provided by an additive manufacturing facility with features as claimed. Preferred embodiments can be deduced from the description, the figures and the claims.

According to the present disclosure, an additive manufacturing facility is provided comprising:

- an additive manufacturing machine with a process chamber,
- a plurality of load items, and
- a loading system for positioning the load items from a first loading zone to a second loading zone, wherein the second loading zone is located above and/or below the process chamber, characterized in that the loading system comprises a lifting column, at least one support arm and at least one load item carrier, wherein the at least one support arm is mechanically coupled to the lifting column for being vertically lifted and lowered along the lifting column, wherein the at least one load item carrier is mechanically coupled to the at least one support arm for being moved along a defined horizontal path relative to the lifting column, wherein the first loading zone is located in a front side area of the loading system and the second loading zone above and/or below the process chamber is located in a rear side area of the loading system.

In other words, the lifting column is positioned axially between the first loading zone and the second loading zone. For a better understanding of the spatial terminology within the additive manufacturing facility, e.g. “axial”, “lateral”, “above”, “below”, it is useful to define a local right-handed Cartesian coordinate system of the additive manufacturing facility, wherein the z-axis extends vertically, the y-axis extends laterally horizontally, and the x-axis extends axially horizontally. So, the lifting column extends along the z-axis, the at least one support arm extends at least partly laterally along the y-axis, and the at least one load item carrier is axially movable along the x-axis relative to the lifting column. Thus, the yz-plane spanned by the lifting column and the at least one support arm separates the front side area of the loading system (towards positive x-axis) and the rear side area of the loading system (towards negative x-axis). Thereby, the loading system is able to pick up a load item in the front side area of the loading system and to position the load item in the rear side area of the loading system. Of course, the reverse transportation from the second loading zone in the rear side area back to the first loading zone in the front side area is also possible. It should be noted that the ordinal numbers “first”, “second”, “third” of the loading zones denote herein in which order a certain load item reaches a loading zone during the loading process. Thus, there may be more than one second loading zone, in particular if the loading system is configured to load more than one load item type.

It should be noted that the second loading zone is preferably located at a higher altitude than the first loading zone. The first loading zone may be located on the ground or on an elevated static platform that a fork truck or jack lift can drive on. For instance, the first loading zone may be accessible via a ramp for placing a load item thereon by means of a fork truck or a jack lift. It is also possible that the second loading zone is located at the same or a lower altitude than the first loading zone, for example if the additive manufacturing facility comprises an additive manufacturing machine with a process chamber at or only slightly above ground level with a second loading zone below. Preferably, the first zone is the same for all types of load items, i.e. the first loading zone may be the entry zone for any type of load item into the loading system. The load items may be brought into the first loading zone manually or by another automatic conveying system. Alternatively, the first loading zone may be a parking zone, in particular without further access than by means of the loading system. The second loading zone may differ among the load item types. A third loading zone may be used as a parking zone for one or more types of load item.

Optionally, the lifting column may be stationary, in particular in the horizontal xy-plane. This is beneficial for the precision of the positioning, because there is no need to precisely reproduce a defined position of the lifting column. Alternatively, the lifting column may be precisely positionable, preferably on rails, laterally along the horizontal y-axis. Such a mobility along the lateral y-axis may be useful for the loading system to serve two or more additive manufacturing machines of the additive manufacturing facility that are lined up along the lateral y-axis. Irrespective of whether the lifting column is stationary or movable, a storage or shelf system may be part of the additive manufacturing facility and served by the loading system. Such a storage or shelf system may have a "single depth" and or a "double depth" along the x-axis. A double depth has the advantage that two load items may be parked or stored by the loading system behind each other in x-direction.

Optionally, the lifting column may have a vertical lifting range at least reaching from the first loading zone to above the process chamber. The number and location of second loading zones may depend on the variety of types of load items the loading system is configured to load. If the loading system is very specifically dedicated to only load a building chamber, one second loading zone may be sufficient. However, if the loading system is more versatile for also loading a raw material powder tank, another second loading zone above the process chamber is beneficial to be reached. Once a raw material powder tank is placed in such a second loading zone at a higher altitude than the process chamber and connected to it, raw material powder may fall by gravitation from the raw material powder tank into a buffer tank of the process chamber in order to supply sufficient raw material powder during the building job.

Optionally, the load item types that the loading system is able to load may be a building chamber, a raw material powder tank, a lid of building chambers, a service module, a filter module, a spare part, a wearing part, a cleaning device, a maintenance robot, an overflow container and/or a raw material powder funnel. It should be noted that a lid of a building chamber may serve as a raw material powder funnel when the building chamber is rotated upside-down for de-powdering after a building job has finished. In case that the loading system is versatile for also loading lids/funnels of building chambers, it is beneficial that there is an additional third loading zone located above the first loading zone in the front side area. The third loading zone may be used to detach and park the lid/funnel during the building job. After a building job, the loading system may position the building chamber at the third loading zone to be closed by the parked lid/funnel for further transportation, cooling-down and/or de-powdering. The third loading zone may be used to park the closed building chamber after a building job.

Optionally, the at least one load item carrier may be telescopically horizontally movable relative to the support arm. This is beneficial to provide an exact and reproducible automatic positioning of the load item in axial x-direction, i.e. forward-backward.

Optionally, the at least one load item carrier may be horizontally movable relative to the support arm from the front side area of the loading system to the rear side area of the loading system. This has the advantage that the lifting column does not have to be movable in axial x-direction, i.e. forward-backward. The lifting column may thus be stationary in x-direction, which reduces significantly the space-consumption of the loading system.

Optionally, the loading system may further comprise a motor for vertically lifting the support arm and thereby the at least one load item carrier along the lifting column. For example, the motor may drive a leadscrew extending vertically along the z-axis for lifting the support arm. Alternatively, the motor may pull up a chain or belt along the lifting column for lifting the support arm.

Preferably, the loading system may comprise two parallel lifting columns having a lateral distance, i.e. in y-direction, to each other. Between the lifting columns, the support arm may extend laterally, i.e. in y-direction, in form of a support bridge that is vertically movable between the lifting columns. Each lifting column may be provided with a motor or one drive motor may be mechanically coupled to drive both lifting columns. The advantage of two lifting columns is more stability due to the distribution of the weight to be lifted.

Optionally, each of the load items may have an axial extension, i.e. in x-direction, being equal to or smaller than a maximum axial load item extension defined by the loading system, wherein the at least one load item carrier is movable along an axial horizontal motion path length relative to the lifting column, i.e. in x-direction, wherein the axial motion horizontal path length is longer than the maximum axial load item extension. Preferably, the axial horizontal motion path length is at least twice, or more preferably, at least three times as long as the maximum axial load item extension. This is in particular beneficial for the loading system to serve a double depth storage or shelf system, so that the loading system is able to park or store two load items behind each other in x-direction. The maximum axial load item extension may be defined by the axial extension of the largest load item that the loading system is supposed to load. This may, for example, be the largest raw material powder tank to load. The axial motion horizontal path length depends on the axial distance of the loading zones to the lifting column. If the center of the first loading zone in the front side area has an axial distance $x_1$ to the lifting column and the center of the second loading zone in the rear side area has an axial distance $x_2$ to the lifting column, the axial horizontal motion path length is at least $x_1+x_2$. Accordingly, the maximum axial load item extension X may fulfil the following criterion:

$$\frac{X}{2} \leq \min\{x_1; x_2\}.$$

More generally, in case of N loading zones to be served by the loading system with a certain load item type, the maximum axial load item extension X may fulfil the following criterion:

$$\frac{X}{2} \leq \min\{x_1, \ldots, x_N\}.$$

The axial horizontal motion path length may thus be larger than or equal to the sum of the largest axial distance among the loading zones in the front side area and of the largest axial distance among the loading zones in the rear side area.

Optionally, the at least one load item carrier may be fork-shaped and may comprise two carrier legs extending axially transverse to the support arm, wherein the carrier legs are configured to fork up the load items in axial direction. This is advantageous for a stable and safe loading process.

Optionally, each of the load items may have a lateral extension being equal to or smaller than a maximum lateral load item extension defined by a distance between the two carrier legs. This is beneficial to fork up the load items at dedicated lateral support surfaces arranged at the lateral sides of the load items. Thereby, there is no need for transportation pallets to fork up the load items from below.

Optionally, the additive manufacturing facility may further comprise a post-processing station, e.g. a de-powdering station, a heating/cooling station and/or an inserting station, preferably located in the front side area of the loading system preferably at a higher altitude than the first loading zone, wherein the loading system is configured to position a building chamber, before a building job, at the second loading zone below the process chamber located in the rear side area of the loading system, wherein the loading system is further configured to position said building chamber, after the building job, into the post-processing station for post-processing the building chamber, e.g. heating, cooling, inserting and/or de-powdering the building chamber. The post-processing station may define the third loading zone.

Optionally, the loading system may be programmable for automatically picking up a load item from the first loading zone and for automatically positioning the load item at the second loading zone, wherein the second loading zone is located at a higher altitude than the first loading zone.

Optionally, the additive manufacturing facility may comprise a third loading zone located above the first loading zone in the front side area of the loading system.

Optionally, as part of the previously described invention or as a separate independent inventive aspect, the loading system may be configured to lift a building chamber from the second loading zone below the process chamber into an elevated operating position below the process chamber. Thereby, the loading system can be used to perform the task of a lifting mechanism of the additive manufacturing facility for vertically placing the building chamber into its operating position. Thus, such a lifting mechanism may not be needed anymore. It should be noted that, as a separate independent inventive aspect, the elevation into the operating position may be implemented with a loading system having the first loading zone and the second loading zone on the same side, i.e. the loading system in this case can only load and unload on the front side only or on the rear side only, whatever the side is on which the process chamber is arranged.

Further embodiments of the present disclosure will now be described by way of example with reference to the following figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
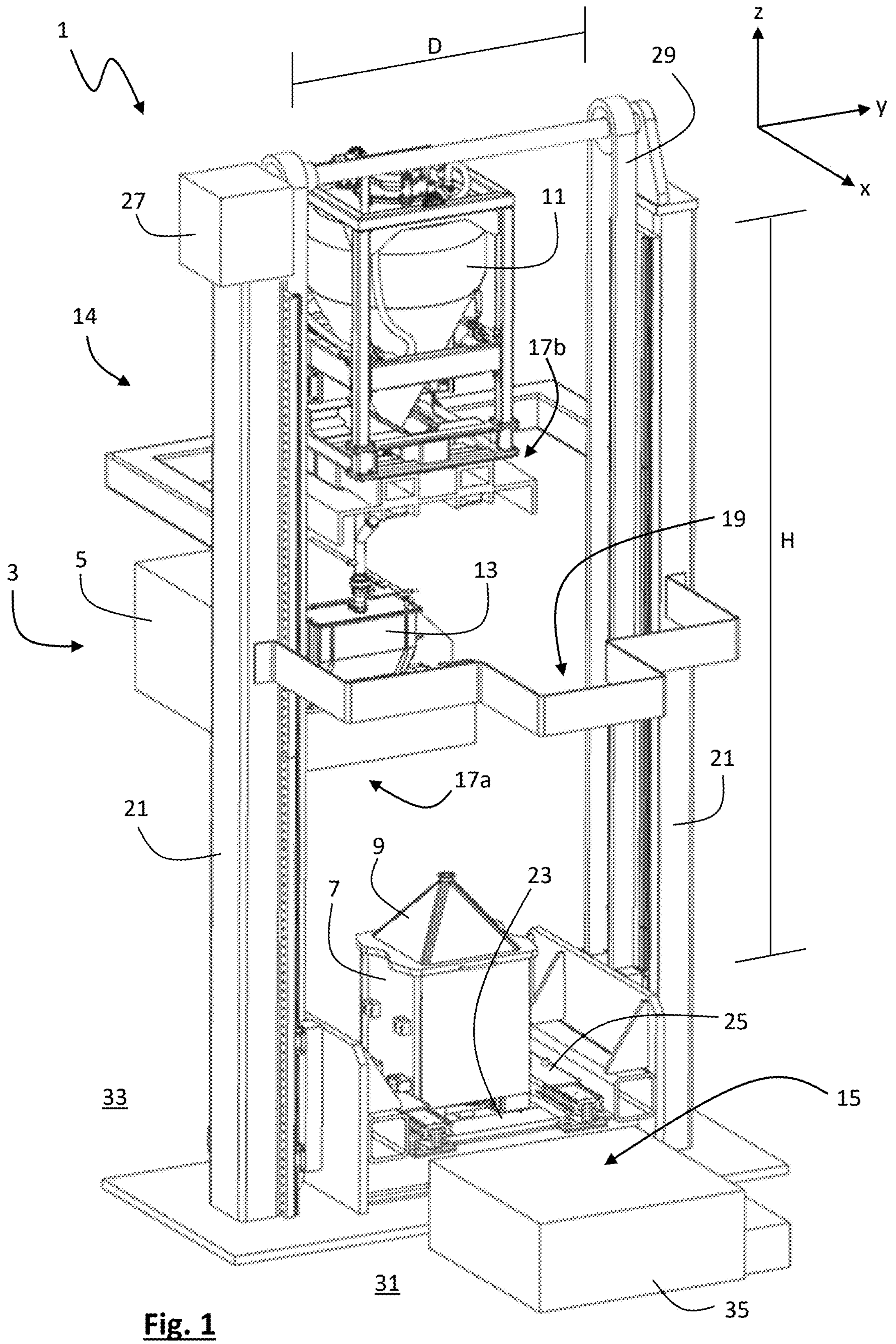
FIG. 1 is a schematic perspective view of an example of an additive manufacturing facility according to the present disclosure.
Figure 2:
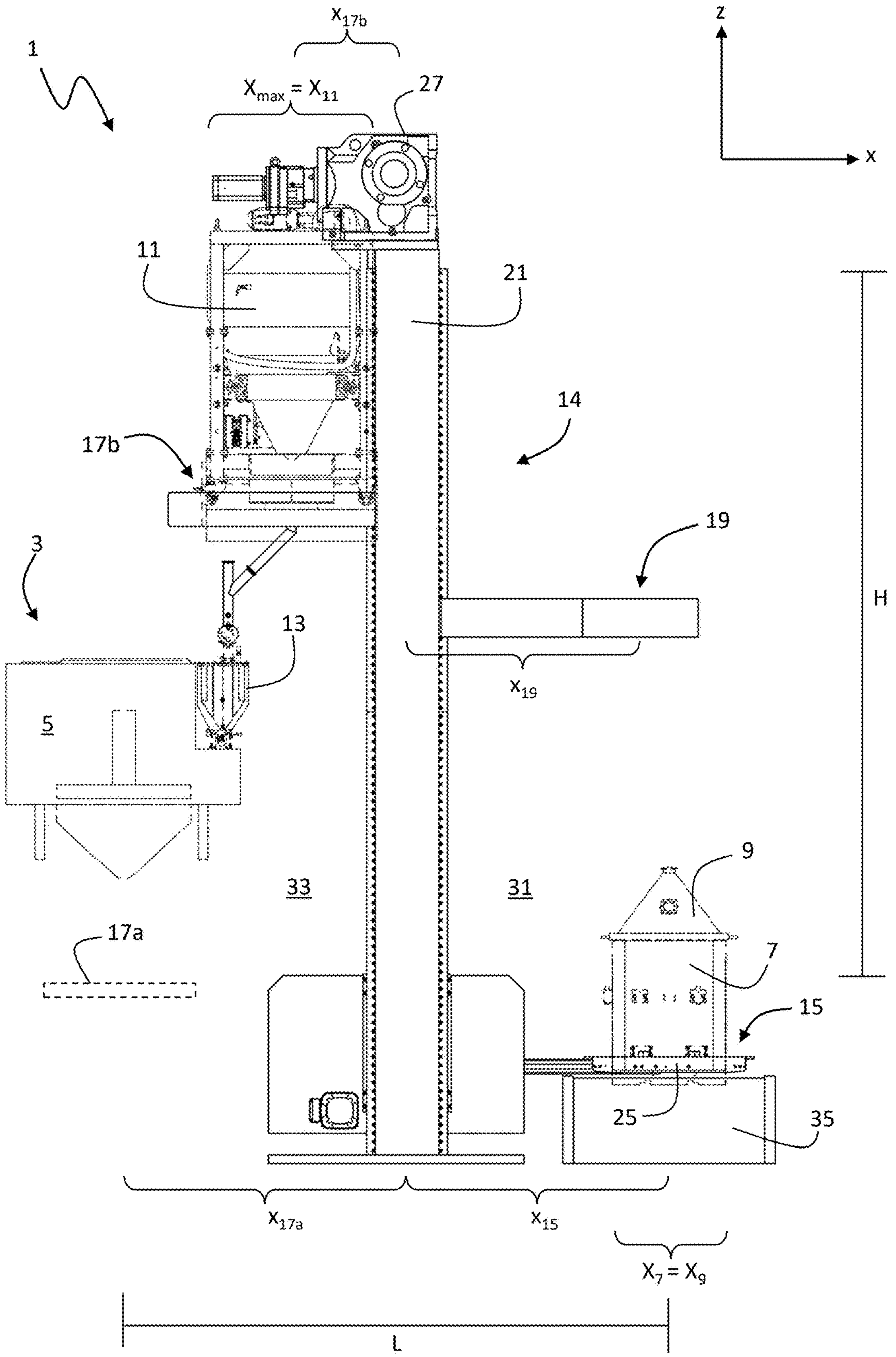
FIG. 2 is a schematic side view of an example of an additive manufacturing facility according to the present disclosure.
Figure 3:
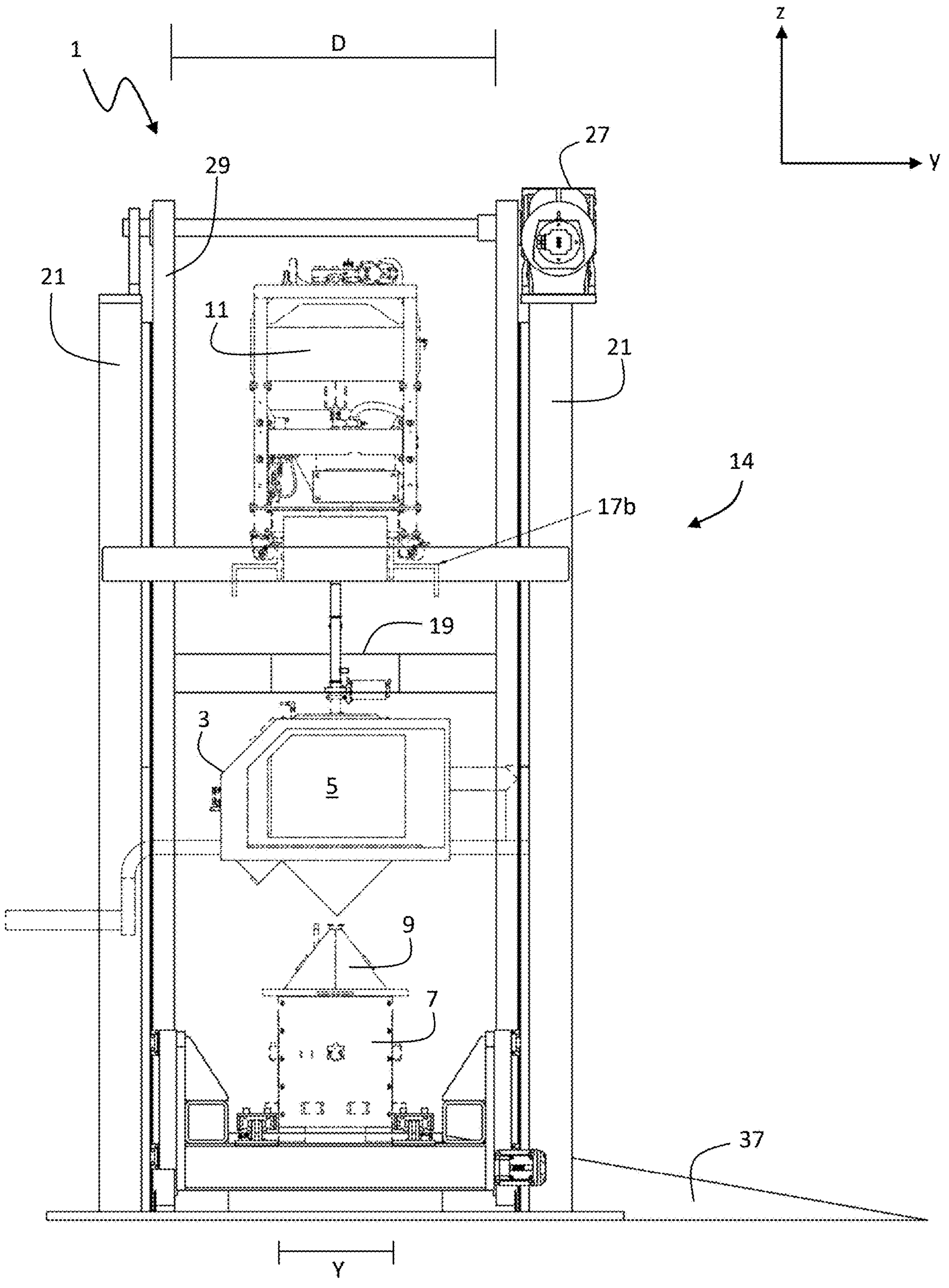
FIG. 3 is a schematic front view of an example of an additive manufacturing facility according to the present disclosure.

Referring to the drawings, FIGS. 1 to 3 show from different perspectives the most relevant units of an additive manufacturing facility 1 to explain the present disclosure in more detail. For a better spatial orientation and understanding of the spatial terminology, e.g. "axial", "lateral", "above", "below", each figure shows a local right-handed Cartesian coordinate system of the additive manufacturing facility 1, wherein the z-axis extends vertically, the y-axis extends laterally horizontally, and the x-axis extends axially horizontally.

As shown in FIGS. 1 to 3, the additive manufacturing facility 1 comprises an additive manufacturing machine 3, of which only a process chamber 5 is schematically shown as a box. The additive manufacturing machine 3 is a laser powder bed fusion (LPBF) machine with a process chamber 5, in which a layer of raw material powder is exposed to a high energy beam of electromagnetic radiation, such as, for example, a laser beam or a particle beam, for selectively sintering and/or melting particles of the raw material powder. A three-dimensional workpiece is additively manufactured in a building job by sequentially sintering and/or melting layer by layer of raw material powder. Before a building job can start, a building chamber 7 is to be placed in an operating position below a bottom opening in the process chamber 5. A vertically movable base plate within the building chamber 7 is in a top-most position when a building job starts, so that the first layer of raw material powder is placed on the base plate of the building chamber 7. After each layer of raw material powder was selectively sintered or melted, the base plate moves downward by one layer thickness to receive a fresh layer of raw material powder to be selectively sintered or melted next. Thus, the base plate moves stepwise downward within the building chamber 7 until the building job is finished. After the building job, the base plate is in a lower position within the building chamber 7 and the additively manufactured three-dimensional workpiece is comprised within the building chamber 7. The building chamber 7 is then detached from the process chamber 5, closed by a funnel-shaped lid 9 and transported off for cooling and/or de-powdering. It should be noted that the funnel-shaped lid 9 functions as a funnel when, after a finished building job, the building chamber 7 is rotated upside-down within a de-powdering station (not shown) for rinsing the residual raw material powder off the manufactured workpiece into a powder recycling system (not shown). The raw material powder needed during the building job is provided in the shown example by a raw material powder tank 11 positioned above the process chamber 5, so that a gravitation-driven supply of raw material powder from the raw material powder tank 11 into a buffer tank 13 of the process chamber 5 is achieved.

For an efficient operation of the additive manufacturing facility 1, it is important to keep the setup time of the additive manufacturing machine 3 between building jobs at a minimum. The logistics and the handling of the building chamber 7, its lid 9 and of the raw material powder tank 11 may be responsible for a significant part of the setup time of the additive manufacturing machine 3. The building chamber 7, its lid 9 and of the raw material powder tank 11 are quite heavy load items 7, 9, 11 having a weight of 40 kg to 6,000 kg or more. The quick, exact and safe handling of such heavy load items 7, 9, 11 is a particular challenge for serial additive manufacturing at an industrial scale. It is thus a challenge to allow a quicker and safer handling of heavy load items 7, 9, 11 to be loaded to and unloaded from the manufacturing machine 3 of the facility 1.

In order to facilitate such handling, the additive manufacturing facility 1 comprises a stationary loading system 14. The loading system 14 is configured to position the load items 7, 9, 11 from a first loading zone 15 to a second loading zone 17*a, b*. The second loading zone 17*a* for the building chamber 7 is located below the process chamber 5, whereas the second loading zone 17*b* for the raw material powder tank 11 is located above the process chamber 5. Above the first loading zone 15, there is also a third loading zone 19 for the building chamber 7 and the lid 9.

The loading system 14 comprises two vertically, i.e. along the z-axis, extending stationary lifting columns 21 having a lateral distance D, i.e. along the y-axis, to each other. The loading system 14 further comprises a support arm 23 and a load item carrier 25. The support arm 23 extends in form of a bridge between the lifting columns 21 and is mechanically coupled to the lifting columns 21 for being vertically lifted and lowered along the lifting columns 21. A motor 27 is provided (here at a top end of one of the lifting columns 21) for driving a chain or belt 29 at each lifting column 21 for lifting and lowering the support arm 23.

The load item carrier 25 is here fork-shaped for forking up a load item 7, 9 11 and comprises two carrier legs extending axially, i.e. along the x-axis, transverse to the support arm 23. The load item carrier 25 is mechanically coupled to the support arm 23 for being telescopically moved forward and backward along a defined horizontal path, along the x-axis, relative to the lifting columns 21. It is important that a vertical lifting range H as well as an axial horizontal motion path length L of the load item carrier 25 relative to the lifting columns 21 is large enough to serve the first loading zone 15 at a front side area 31 of the loading system 14 as well as the second loading zones 17*a,b* at a rear side area 33 of the loading system 14.

Thus, the yz-plane spanned by the lifting columns 21 and the support arm 23 separates the front side area 31 of the loading system 14 (towards positive x-axis) and the rear side area 33 of the loading system 14 (towards negative x-axis). The loading system 14 is thus able to pick up a load item 7, 9, 11 in the front side area 31 of the loading system 14 and to position the load item 7, 9, 11 in the rear side area 33 of the loading system 14. Of course, the reverse transportation from the respective second loading zone 17*a,b* in the rear side area 33 back to the first loading zone 15 in the front side area 31 is also possible.

The first loading zone 15 is here located on an elevated static platform 35 that a fork truck or jack lift can easily place a load item 7, 9 11 on. The first loading zone 15 is the entry zone for any type of load item 7, 9, 11 into the loading system 14. So, a building chamber 7, a lid 9 or a raw material powder tank 11 or any other load item to be loaded is firstly placed by operating personnel on the first loading zone 15. Both second loading zones 17*a, b* in the rear side area 33 of the loading system 14 are located at a higher altitude than the first loading zone 15.

FIGS. 2 and 3 show a situation in which the building chamber 7, being closed by the lid 9, is positioned at the first loading zone 15 for being forked-up by the load item carrier 25. FIG. 3 shows that the first loading zone 15 can be reached by an optional ramp 37 that a fork truck or jack lift can use to drive on the elevated platform 35. The carrier legs of the load item carrier 25 have a lateral distance Y to each other so that the building chamber 7 fits between the carrier legs for being forked-up. The load item carrier 25 is shown in a most forward, i.e. in positive x-direction, position by being telescopically moved forward relative to the lifting columns 21.

As shown in FIG. 2, each of the load items has an axial extension $X_7$, $X_9$, $X_{11}$, respectively. The axial extension $X_7$, $X_9$, $X_{11}$ is equal to or smaller than a maximum axial load item extension $X_{max}$ defined by the loading system 14. In the shown example, the raw material powder tank 11 has the largest axial extension $X_{11} \leq X_{max}$. For the load item carrier 25 to be able to pick up a load item 7, 9, 11 at a loading zone 15, 17*a,b*, 19, it is movable along the axial horizontal motion path length L relative to the lifting column 21. The axial motion horizontal path length L is longer than the maximum axial load item extension $X_{max}$. Preferably, as shown in FIG. 2, the axial horizontal motion path length L is at least three times as long as the maximum axial load item extension $X_{max}$, i.e. $L \geq 3X_{max}$. The axial motion horizontal path length L depends on the axial distances $x_{15}$, $x_{17a}$, $x_{17b}$, $x_{19}$ of the loading zones 15, 17*a,b*, 19 to the lifting column 21. The axial horizontal motion path length L is larger than or equal to the sum of the largest axial distance $x_{15}$, $x_{19}$ among the loading zones 15, 19 in the front side area 31 and of the largest axial distance $x_{17a}$, $x_{17b}$ among the loading zones 17*a*, 17*b* in the rear side area 33. In the example shown in FIG. 2, the axial horizontal motion path length is $L \geq X_{15} + x_{17a}$.

In FIGS. 2 and 3, the raw material powder tank 11 is already placed at its second loading zone 17*b* above the process chamber 5. As the raw material powder tank 11 is here the heaviest type of load item 7, 9, 11 at the highest elevation, it is advantageous that the center of the second loading zone 17*b* for the raw material powder tank 11 has a smaller distance $x_{2b}$ to the lifting columns 21 than a distance $x_1$ of the first loading zone 15 to the lifting columns 21. This reduces the weight-imbalance-induced tilting moment that the loading system 14 needs to withstand.

Figure 4C:
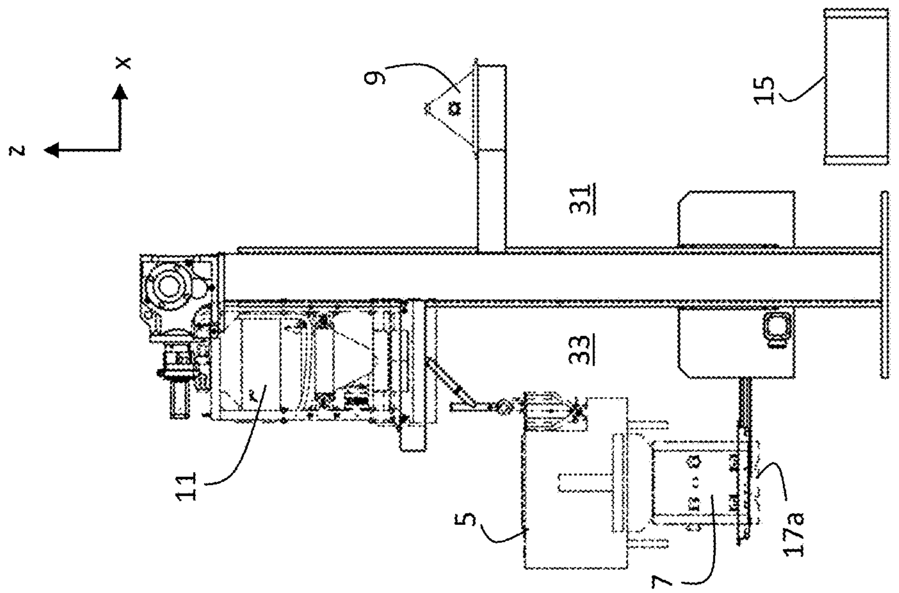
FIG. 4*a*, FIG. 4*b* and FIG. 4*c* are schematic side views of the additive manufacturing facility according to FIG. 2 in different loading situations.
Figure 4B:
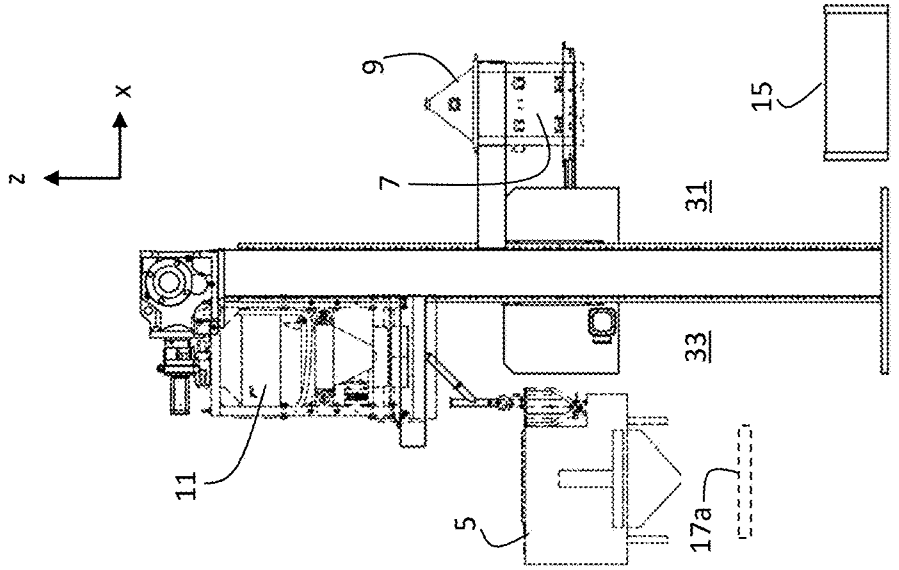
Figure 4A:
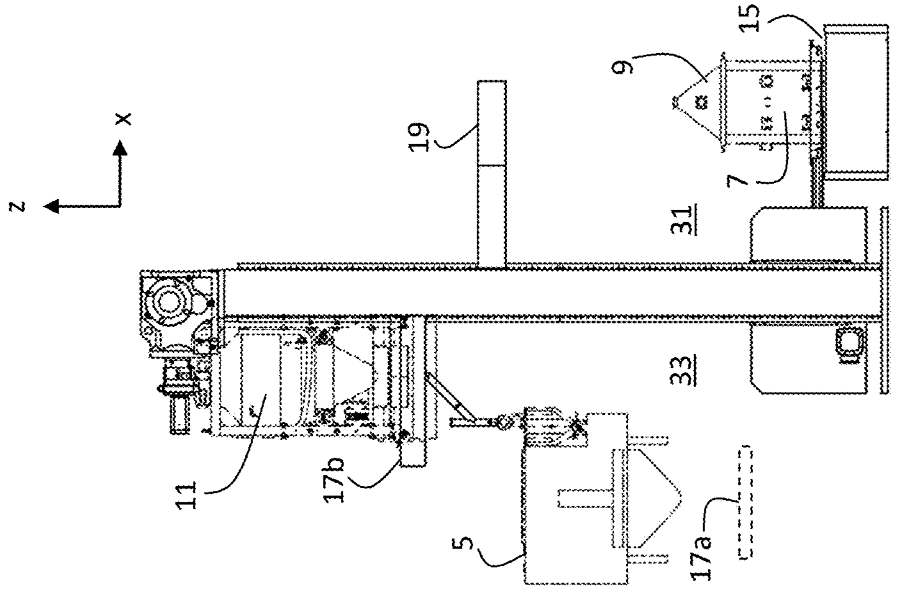

FIGS. 4*a-c* and 5*a-c* show a sequence of different loading situations that may occur during operation of the loading system 14. FIG. 4*a* shows the situation as in FIGS. 2 and 3, wherein the raw material powder tank 11 is already positioned in its second loading zone 17*b* above the process chamber 5. The closed building chamber 7 is just being picked up by the load item carrier 25 from the first loading zone 15. In FIG. 4*b*, the closed building chamber 7 is lifted up for taking the lid 9 off the building chamber 7 to park the lid 9 during a building job at the third loading zone 19 for the building chamber 7 located above the first loading zone 15. In this example, the third loading zone 19 for the building chamber 7 is thus the second loading zone for the lid 9.

As shown in FIG. 4*c*, the open building chamber 7 is then positioned in its second loading zone 17*a* below the process chamber. The loading system 14 can even be used to make the final vertical positioning into the operating position for a building job. Alternatively, another lifting system of the addictive manufacturing facility 1 may pick up the building chamber 7 from the second loading zone 17*a* in order make the final vertical positioning into the operating position for a building job.

Figure 5C:
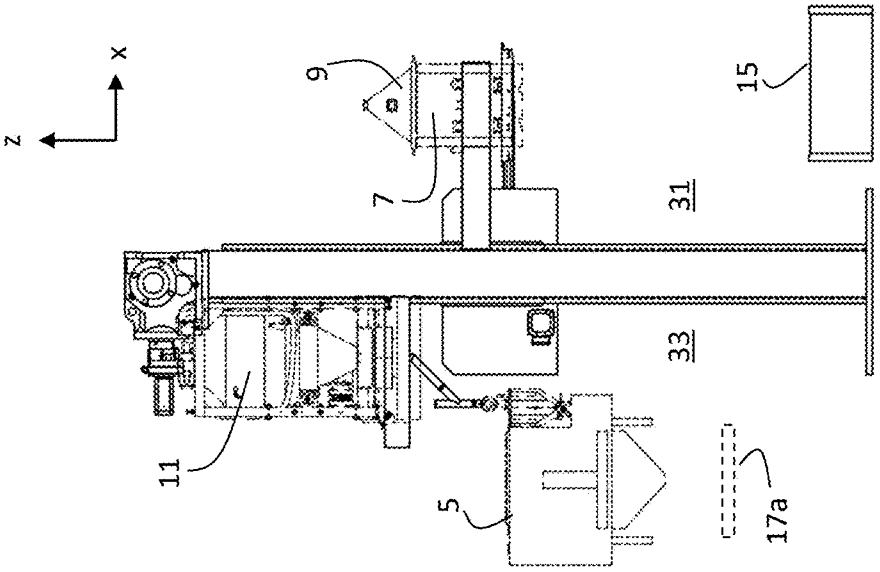
FIG. 5*a*, FIG. 5*b* and FIG. 5*c* are schematic side views of the additive manufacturing facility according to FIG. 2 in further loading situations.
Figure 5B:
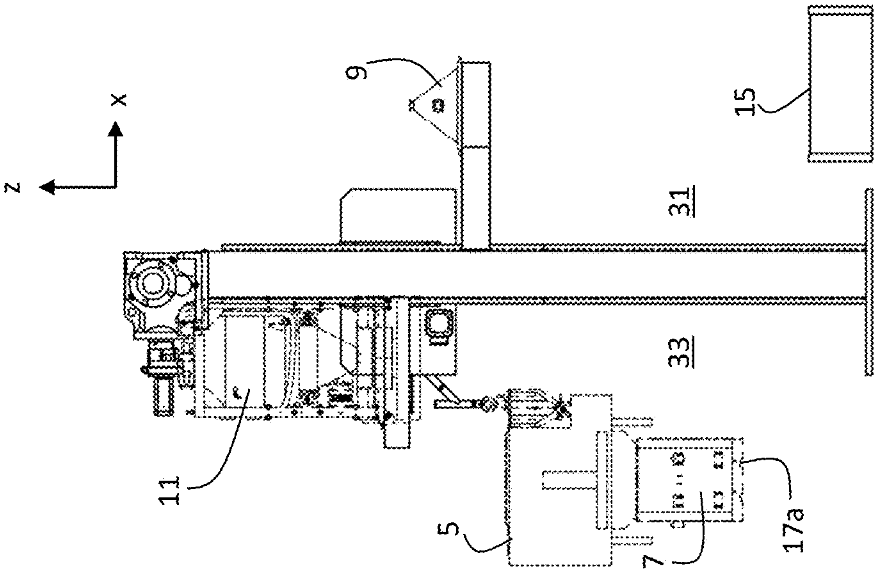
Figure 5A:
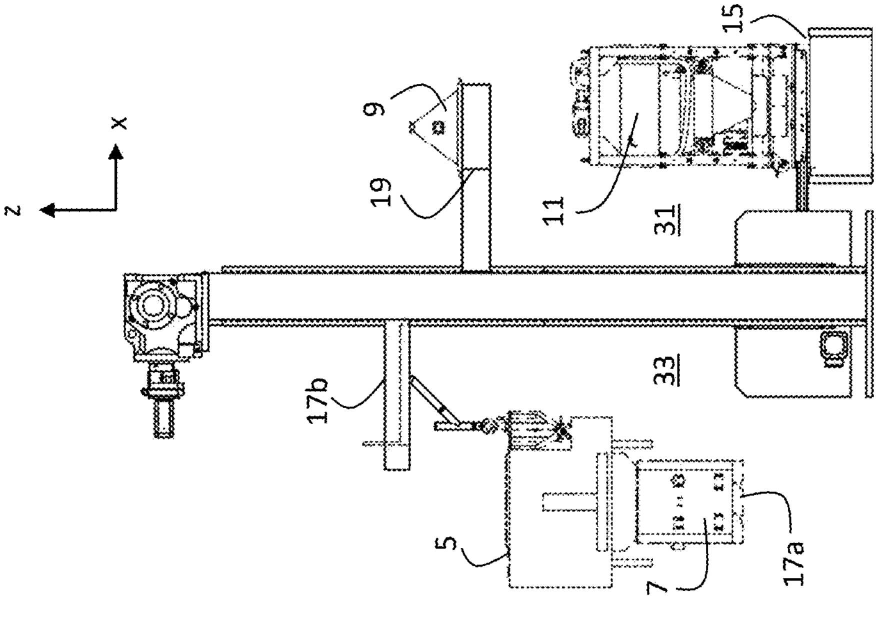

FIG. 5*a* shows a situation in which the raw material powder tank 11 must be exchanged or refilled during a building job in order ensure an uninterrupted supply of raw material powder. An advantage of the loading system 14 is that the exchange or refilling of the raw material powder tank 11 is possible in such a short time window that it can be performed during a building job. Thus, the exchange or refilling is faster than the powder buffer 13 of the additive manufacturing machine 3 empties. Therefore, the exchange of the raw material powder tank 11 does not add to the setup time of the additive manufacturing machine 3 between building jobs. In FIG. 5*a*, the new or refilled full raw material powder tank 11 is just being fork-up by the load item carrier 25 from the first loading zone 15. In FIG. 5*b*, the new or refilled raw material powder tank 11 is already positioned in its designated second loading zone 17*b* above the process chamber 5.

After the building job has finished, as shown in FIG. 5*c*, the building chamber 7 containing the additively manufactured workpiece is positioned for cooling down at its designated third loading zone 19, where the lid 9 was parked during the building job. Thus, the lid 9 was first put back on the building chamber 7 (analogous to FIG. 4*b*), so that the closed building chamber 7 can cool down at its third loading zone 19. In an alternative not-shown embodiment, the third loading zone 19 may be part of a de-powdering station in which the building chamber 7 can be rotated upside-down, so that the residual powder around the workpiece is rinsed through the funnel-shaped lid 9 into a powered recycling system. While the building chamber 7 is positioned at the third loading zone 19, the loading system 14 can be used to setup the additive manufacturing machine 3 with a new building chamber for the next building job to start as quickly as possible.

While specific embodiments of the invention have been shown and described in detail to illustrate the application of the principles of the invention, it will be understood that the invention may be embodied otherwise without departing from such principles.

LIST OF REFERENCE NUMERALS

1 additive manufacturing facility
3 additive manufacturing machine
5 process chamber
7 building chamber
9 lid/funnel
11 raw material powder tank
13 powder buffer
14 loading system
15 first loading zone
17*a, b* second loading zone
19 third loading zone
21 lifting column
23 support arm
25 load item carrier
27 motor
29 chain/belt
31 front side area
33 rear side area
35 platform
37 ramp
D lateral distance between lifting columns
Y lateral distance between carrier legs
H vertical lifting range
L axial horizontal motion path length
$X_{max}$ maximum axial load item extension
$X_7$ axial extension of building chamber
$X_9$ axial extension of lid
$X_{11}$ axial extension of raw material powder tank
$x_{15}$ axial distance of the first loading zone to the lifting column
$x_{17a}$ axial distance of the lower second loading zone to the lifting column
$x_{17b}$ axial distance of the upper second loading zone to the lifting column
$x_{19}$ axial distance of the third loading zone to the lifting column

The invention claimed is:

1. An additive manufacturing facility comprising an additive manufacturing machine, wherein the additive manufacturing machine comprises:

a process chamber, a plurality of load items, and a loading system configured to position the load items from a first loading zone to a second loading zone, wherein the second loading zone is located above and/or below the process chamber, wherein the loading system comprises:

a lifting column, at least one support arm and at least one load item carrier, wherein the at least one support arm is mechanically coupled to the lifting column for being vertically lifted and lowered along the lifting column, wherein the at least one load item carrier is mechanically coupled to the at least one support arm for being moved along a defined horizontal path relative to the lifting column, wherein the first loading zone is located in a front side area of the loading system and the second loading zone is located in a rear side area of the loading system, wherein each of the load items has an axial extension being equal to or smaller than a maximum axial load item extension defined by the loading system, wherein the at least one load item carrier is movable along an axial horizontal motion path length relative to the lifting column, wherein the axial motion horizontal path length is longer than the maximum axial load item extension, the axial horizontal path length being linear straight from the front side area to the rear side area.

2. The additive manufacturing facility according to claim 1, wherein the lifting column is stationary.

3. The additive manufacturing facility according to claim 1, wherein the lifting column has a vertical lifting range reaching at least from the first loading zone to above the process chamber.

4. The additive manufacturing facility according to claim 1, wherein the at least one load item carrier is telescopically horizontally movable relative to the at least one support arm.

5. The additive manufacturing facility according to claim 1, wherein the at least one load item carrier is horizontally movable relative to the at least one support arm from the front side area of the loading system to the rear side area of the loading system.

6. The additive manufacturing facility according to claim 1, further comprising a motor for vertically lifting the at least one support arm and thereby the at least one load item carrier along the lifting column.

7. The additive manufacturing facility according to claim 1, wherein the axial horizontal motion path length is at least twice, as long as the maximum axial load item extension.

8. The additive manufacturing facility according to claim 1, wherein the at least one load item carrier is fork-shaped and comprises two carrier legs extending axially transverse to the at least one support arm, wherein the carrier legs are configured to fork up the plurality of load items in an axial direction.

9. The additive manufacturing facility according to claim 8, wherein each of the load items has a lateral extension being equal to or smaller than a maximum lateral load item extension defined by a distance between the two carrier legs.

10. The additive manufacturing facility according to claim 1, wherein the plurality of load items comprise at least one item selected of the group of load item types comprising: a building chamber, a raw material powder tank, a lid of a building chamber, and a raw material powder funnel.

11. The additive manufacturing facility according to claim 1, further comprising a post-processing station located in the front side area of the loading system.

12. The additive manufacturing facility according to claim 1, wherein the loading system is programmable for automatically picking up a load item from the first loading zone and for automatically positioning the load item at the second loading zone, wherein the second loading zone is located at a higher level vertically than the first loading zone.

13. The additive manufacturing facility according to claim 1, further comprising a third loading zone, wherein the third loading zone is located above the first loading zone in the front side area of the loading system.

14. The additive manufacturing facility according to claim 1, wherein the loading system is configured to lift at least one of said plurality of load items, which comprises a building chamber, from the second loading zone below the process chamber into an elevated operating position below the process chamber.

15. The additive manufacturing facility according to claim 1, further comprising a post-processing station located in the front side area of the loading system, at a higher level vertically than the first loading zone, wherein the loading system is configured to position at least one of said plurality of load items, which comprises a building chamber, before a building job, at the second loading zone below the process chamber, wherein the loading system is further configured to position said building chamber, after the building job, into the post-processing station for post-processing the building chamber.

16. An additive manufacturing facility comprising:

an additive manufacturing machine comprising:

- a process chamber,
- a plurality of load items, and
- a loading system configured to position the load items from a first loading zone to a second loading zone, wherein the second loading zone is located above and/or below the process chamber, wherein the loading system comprises:
- a lifting column,
- at least one support arm, and
- at least one load item carrier, wherein the at least one support arm is mechanically coupled to the lifting column for being vertically lifted and lowered along the lifting column, wherein the at least one load item carrier is mechanically coupled to the at least one support arm for being moved along a defined horizontal path relative to the lifting column, wherein the first loading zone is located in a front side area of the loading system and the second loading zone is located in a rear side area of the loading system, wherein the at least one load item carrier is configured to be movable, relative to the lifting column, along an axial horizontal motion path length in a linear and horizontal direction between the front side area and the rear side area to change a horizontal length of the load item carrier, the at least one load item carrier being movable in the linear and horizontal direction independent of movement of the support arm along the lifting column.

17. The additive manufacturing facility according to claim 16, wherein each of the load items has an axial extension being equal to or smaller than a maximum axial load item extension defined by the loading system, wherein the axial motion horizontal path length is longer than the maximum axial load item extension.

18. The additive manufacturing facility according to claim 16, wherein the at least one load item carrier comprises an end portion, wherein the at least one load item carrier is movable in the linear and horizontal direction such that a distance between the support arm and the end portion changes based on movement of the at least one load item carrier in the linear and horizontal direction.

19. The additive manufacturing facility according to claim 17, wherein the axial horizontal motion path length is at least twice, as long as the maximum axial load item extension.

20. The additive manufacturing facility according to claim 16, wherein the at least one load item carrier is fork-shaped and comprises two carrier legs extending axially transverse to the at least one support arm, wherein the carrier legs are configured to fork up the plurality of load items in an axial direction.

* * * * *